March 18, 1958 — C. W. TOWNE — 2,827,054

TEAT DILATOR

Filed April 29, 1955

INVENTOR.
CHARLES W. TOWNE
BY Carlsen & Hagle
ATTORNEYS

United States Patent Office 2,827,054
Patented Mar. 18, 1958

2,827,054

TEAT DILATOR

Charles W. Towne, Foley, Minn.

Application April 29, 1955, Serial No. 504,947

6 Claims. (Cl. 128—341)

This invention relates to a device for dilating the teat or udder of a milch cow.

It is found that teat dilators presently in common use are ineffective in that they fail to stretch the teat canal sufficiently to allow proper healing of the canal walls particularly around the end of the teat where the dilation is most necessary. This is due to the fact that the dilators now known in the art comprise a single elongated element which is insertable upwardly into the teat to dilate the canal but which is lacking any lateral resiliency such as will exert a positive spreading pressure on the canal walls after the insertion. So designed and used these dilators serve merely as tapered plugs and do not function to truly dilate the canal in the desired manner. Furthermore a rigid dilator of this type having the necessary width to serve its intended purpose is often very difficult to apply to the teat, particularly where the teat duct is tightly constricted, in view of the fact that it must be wedged upwardly into the duct.

Accordingly, a primary object of my invention is to provide a teat dilator which is adapted to exert a positive lateral pressure on the walls of the sphincter muscle of the teat.

Another and more specific object of the invention is to provide a new and improved teat dilator which is constructed in the nature of a sear spring which may be compressed to a slender elongated shape for insertion into the teat duct to be dilated, then released to a laterally spread condition to exert an outward pressure on the duct walls, then recompressed to its slender condition for removal from the teat.

Still another object of the invention is to provide a teat dilator having two resiliently associated legs with handle means on each leg allowing the dilator to be completely controlled by one hand of the operator.

Still another object of the invention is to provide a device for holding the canal of a cow teat in dilated condition which leaving a substantial area of the canal wall in the dilated area exposed to the atmosphere.

A still further object of the invention is to provide a teat dilator adapted to exert an outward pressure on the teat canal wall after injury or surgical incision to hold blood and serum against the wall to quicken the healing process and allow a minimum of excess granulation tissue.

With these and still additional objects in view my invention broadly comprises a length of resilient wire material having a soft absorbent coating thereon, said wire being centrally bent back upon itself in a general V-shape with the legs thereof bowed away from each other in their divergence, and the wire end portions being formed to provide handles at the ends of the legs for compressing the legs together to a straight condition against the resilience of the wire material.

The above mentioned and still additional objects of the invention will be brought to light during the course of the following specification, reference being made to the accompanying drawing, in which—

Figure 1:
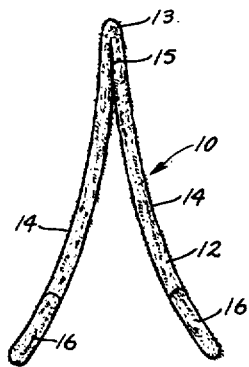
Fig. 1 is a plan view of the dilator in its normal distended condition.
Figure 2:
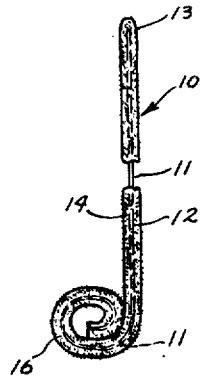
Fig. 2 is a side elevation of the device with the covering partially broken away to show the wire material and with the wire shown in broken lines throughout the remainder of the dilator.

Referring now more particularly to the drawing reference numerals will be used to denote like parts and structural features in the different views. The dilator is denoted generally at 10 and is formed of a single length of wire material 11 which preferably carries a covering 12 which is soft and absorbent. The wire 11 may be a single length of wire with the covering 12 formed of fiber strands cemented or otherwise adhered thereto or, in the alternative, the wire 11 may be formed by two or more wire strands twisted together in spiral form with small pieces of the absorbent material 12 held between the strands. The latter construction would be in accordance with the disclosure of Naylor in his patent No. 1,625,906, which issued April 26th, 1937. It is also possible that wire 11 may consist of one or more strands with fabric sheet material secured therearound to provide the covering 12. In any event, it is necessary that the wire material 11 be both stiff and resilient to satisfactorily serve the present purpose and while the coating 12 is not an absolute necessity it does prove most desirable. This is for the reasons that the coating renders the dilator less irritable to the teat and serves as a carrier for medicaments and antiseptics to be applied to the teat area being dilated.

The configuration of the dilator will now be described. The coated wire 11 is bent back upon itself at its center in a general V-shape, as shown in Fig. 1. This provides the dilator with a blunt point or tip 13 and a pair of diverging legs 14. While legs 14 lie on a common plane they curve outwardly from each other from the point 13 so that the rate of divergence therebetween increases as the legs extend. Furthermore, the curvature of the legs gradually increases as the legs extend away from the point 13. Thus in the area 15 adjacent the point the legs are so close to each other that the coating 12 is somewhat compressed therebetween so as to yieldably resist pinching of the legs together.

Figure 3:
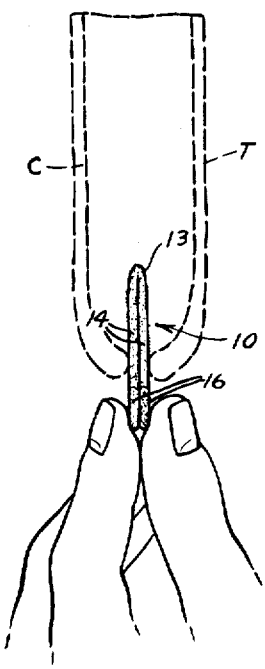
Fig. 3 is an elevational view showing the dilator manually compressed and inserted into the lower end of the teat of a milch cow.

At the lower or extended ends of the legs the wire 11 is bent or curled at right angles to the common plane of the legs as at 16 to provide handle portions for manipulating the dilator. It is found that to coil the ends as shown so that the handle portions 16 are round allows them to be firmly grasped by the thumb and a finger of the hand as shown in Fig. 3.

Use of the dilator will now be described and in this connection attention is directed to Figs. 3 and 4, where a teat T having a canal C is shown in broken lines. In applying the dilator the coating 12 thereof on the legs 14 is saturated with a medicament or antiseptic as desired. The handle portions 16 are then pinched together compressing the dilator to the condition shown in which it may be easily inserted upwardly into the lower end of the canal C. When the dilator has been inserted to the desired position the portions 16 are released allowing the legs 14 to spread apart toward their normal relative positions.

Figure 4:
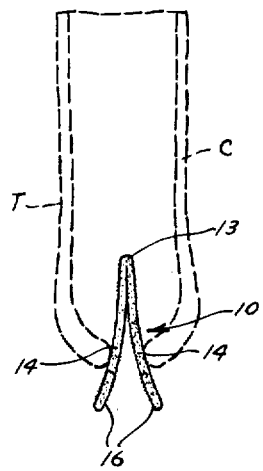
Fig. 4 is similar to Fig. 3 showing the spread condition of the dilator after it has been released to dilate the teat canal.

The dilator has sufficient compressive strength to distend the canal C as shown in Fig. 4. The legs 14 tend to return toward their normal position because of their bowed shape and the resiliency of the wire 11. The normal bowed shape of the legs and their connection at the tip 13 necessarily causes the handle portions 16 to spread when released. The dilator thus acts in the manner of a sear spring with the legs 14 exerting an outward pressure on the walls of canal C. Thus the dilator will be retained securely in the milk duct and exert the desired dilating pressure within the teat.

An important advantage over the plug type dilator will be readily recognized in that the yielding legs of my dilator are responsive to normal expansion and contraction of the teat muscles. In addition the walls of the canal adjacent the end of the teat are, except where engaged by the dilator, openly exposed for more rapid healing.

For removal of the dilator the portions 16 are again pinched together to decrease the width of the dilator for easy withdrawal and a minimum of frictional drag on the canal walls.

It will be understood that the sear spring construction provides for a positive lateral pressure within the duct and yet allows manufacture of the dilator at a very reasonable cost. The handle portions 16 being curled or otherwise formed so as to move flatwise against each other allow convenient manipulation by one hand of the operator, freeing the other hand to hold the teat to be treated.

It is also of importance in this construction that the bend or point at 13 be relatively sharp for ease of insertion in a constricted teat duct. The coating 12 of soft material eliminates the danger of puncturing the teat.

I have accordingly provided a novel teat dilator which economically and effectively carries out the aforementioned objectives. It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a teat dilator, a length of wire material being centrally bent back upon itself to form a sharp point with two equal legs lying on a common plane and diverging in their extension from the point, and said wire being highly resilient allowing the legs to be compressed together but tending to return to their normal divergent condition when the compressive force is released.

2. In a teat dilator, a length of resilient wire material having a soft absorbent covering, said wire being formed in a general V-shape with two legs lying on a common plane and diverging from a point thereon, the end portions of the wire being curled out of said plane on separate planes lying perpendicular to said first mentioned plane to form handles said handles being spaced apart a greater distance than the most divergent portions of the remainder of said legs.

3. A teat dilator comprising a length of resilient wire covered with a soft absorbent material, said wire being centrally bent back upon itself to form a sharp point with two legs lying on a common plane and relatively diverging in their extension from the point, said legs each having an inwardly bowed configuration whereby the rate of divergence increases as the legs extend from the point.

4. In a teat dilator, a length of wire material configured to have an acute bend in the center thereof forming a point with the portions on each side of the point lying in near parallel adjacent the point and then curving outwardly from each other in their extension therefrom but lying on a common plane, the extended end of each said portion being curled to form a flat handle lying on a plane which is at right angles to said common plane and which extends substantially through said point, and said wire material being highly resilient whereby said portions will yieldably resist straightening as the handles are moved together.

5. A teat dilator comprising a length of resilient wire being centrally bent back upon itself to form a sharp point with two legs lying on a common plane and relatively diverging in their extension from the point, at least one of said legs having an inwardly bowed configuration whereby the rate of divergence increases as the legs extend from the point.

6. A teat dilator comprising a single length of elongated resilient material formed in a V-shape with the two legs extending on a common plane in a generally diverging relation from a sharp point, the extended end portions of said legs being configured in the form of handles for manual gripping to move the legs in a relatively closing direction, and the leg portions adjacent said point being in contact with each other to yieldably resist said relative closing movement.

References Cited in the file of this patent
UNITED STATES PATENTS
| | | |
|---|---|---|
| 982,996 | Rowell | Jan. 31, 1911 |

FOREIGN PATENTS
| | | |
|---|---|---|
| 103,552 | Switzerland | Dec. 29, 1922 |
| 561,324 | France | Aug. 3, 1923 |